(12) United States Patent
Glenn

(10) Patent No.: US 12,333,618 B2
(45) Date of Patent: Jun. 17, 2025

(54) SAFE ENCOUNTER MOBILE APP METHOD AND DEVICES

(71) Applicant: Everett Glenn, Long Beach, CA (US)

(72) Inventor: Everett Glenn, Long Beach, CA (US)

( * ) Notice: Subject to any disclaimer, the term of this patent is extended or adjusted under 35 U.S.C. 154(b) by 629 days.

(21) Appl. No.: 17/706,547

(22) Filed: Mar. 28, 2022

(65) Prior Publication Data

US 2022/0230260 A1 Jul. 21, 2022

Related U.S. Application Data

(63) Continuation of application No. 17/149,889, filed on Jan. 15, 2021, now Pat. No. 11,321,793.

(51) Int. Cl.
*G06Q 50/18* (2012.01)
*G08B 25/01* (2006.01)
*H04W 4/029* (2018.01)

(52) U.S. Cl.
CPC ........... *G06Q 50/18* (2013.01); *G08B 25/016* (2013.01); *H04W 4/029* (2018.02)

(58) Field of Classification Search
CPC ...... G06Q 50/18; H04W 4/029; G08B 25/016
See application file for complete search history.

(56) References Cited

U.S. PATENT DOCUMENTS

2023/0047028 A1\* 2/2023 Redmon ................. H04W 4/02

\* cited by examiner

*Primary Examiner* — Sam Bhattacharya
(74) *Attorney, Agent, or Firm* — Edmond DeFrank

(57) ABSTRACT

The embodiments disclose a method including providing a safe encounter mobile app for advising an individual on critical choices during an event with law enforcement personnel, clicking a Safe Encounter icon to activate the safe encounter mobile app, starting at least one safe encounter mobile app feature automatically upon starting the safe encounter mobile app, sending an Alert Text to persons on a predetermined list of individuals during an event with law enforcement personnel, displaying the user's legal Rights during an event with law enforcement personnel, and displaying methods to be calm during an event with law enforcement personnel.

14 Claims, 16 Drawing Sheets

SAFE ENCOUNTER MOBILE APP METHOD AND DEVICES

CROSS-REFERENCED TO RELATED APPLICATIONS

This Patent Application is a Continuation and claims priority to United States Patent Application entitled: "A SAFE ENCOUNTER MOBILE APP METHOD AND DEVICES", U.S. Ser. No. 17/149,889 filed on Jan. 15, 2021 filed by EVERETT GLENN et al., the U.S. Patent Application being incorporated herein by reference which claims priority on the Provisional United States Patent Application entitled: "A SAFE ENCOUNTER MOBILE APP METHOD AND DEVICES", U.S. Ser. No. 63/053,582 filed on Jul. 18, 2020 filed by EVERETT GLENN et al., the U.S. Patent Application being incorporated herein by reference.

BACKGROUND

Black residents were more likely to be stopped by police than white or Hispanic residents, both in traffic stops and street stops. Black and Hispanic residents were also more likely to have multiple contacts with police than white residents, especially in the contexts of traffic and street stops. More than 1 in 6 Black residents who were pulled over in a traffic stop or stopped on the street had similar interactions with police multiple times over the course of the year.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a safe encounter mobile app method and devices is described for illustrative purposes and the underlying system can apply to any number and multiple types of encounters. In one embodiment of the present invention, the safe encounter mobile app method and devices can be configured using a portable digital device. The safe encounter mobile app method and devices can be configured to include using with a smart phone and can be configured to include a digital tablet using the present invention.

Figure 1:
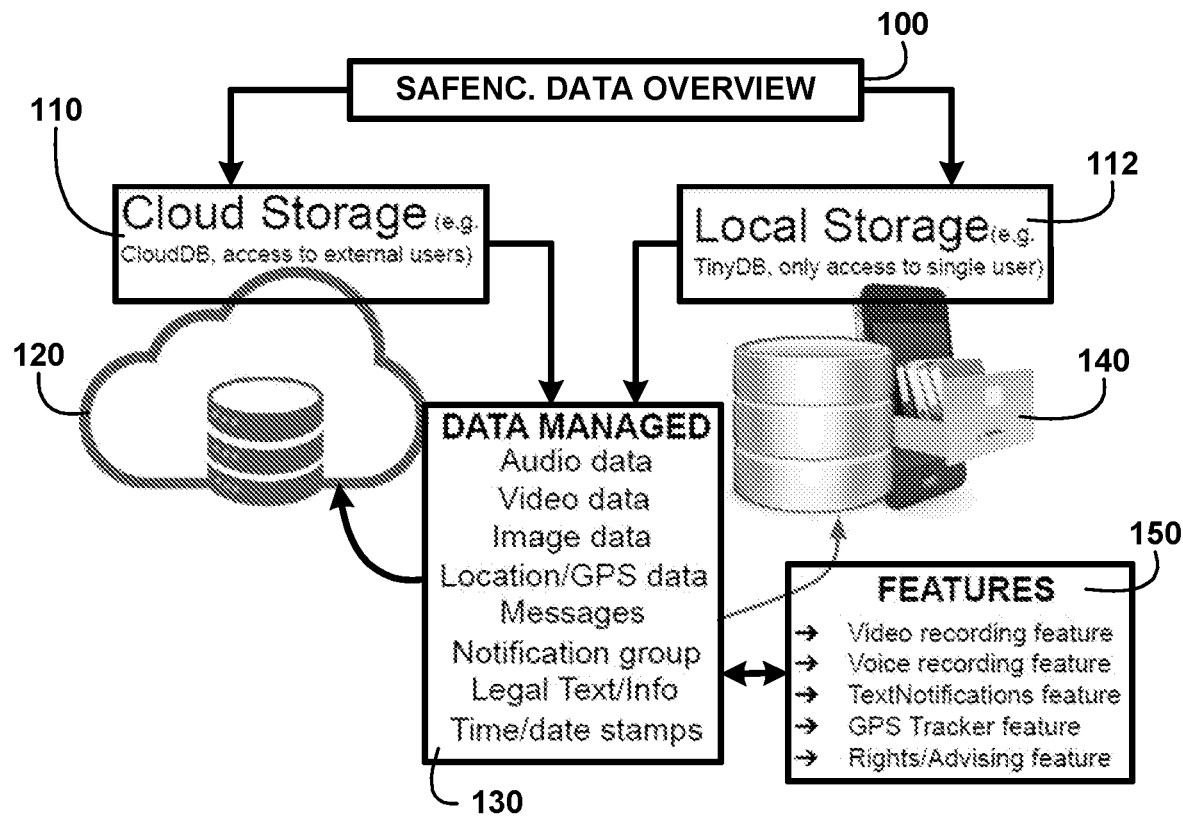
FIG. 1 shows for illustrative purposes only an example of an overview of a safe encounter data overview of one embodiment.

FIG. 1 shows for illustrative purposes only an example of an overview of safe encounter data overview of one embodiment. FIG. 1 shows a SAFENC. Data overview 100 including Cloud Storage (e.g. CloudDB, access to external users) 110, Local Storage (e.g. TinyDB, only access to single user) 112. DATA MANAGED includes Audio data, Video data, Image data, Location/GPS data, Messages, Notification group, Legal Text/Info and Time/date stamps 130 with data transmitted and stored on a cloud 120 and local storage 140. Features include a Video recording feature, Voice recording feature, TextNotifications feature, GPS Tracker feature, and a Rights/Advising feature 150 of one embodiment.

Detailed Description

Figure 2:
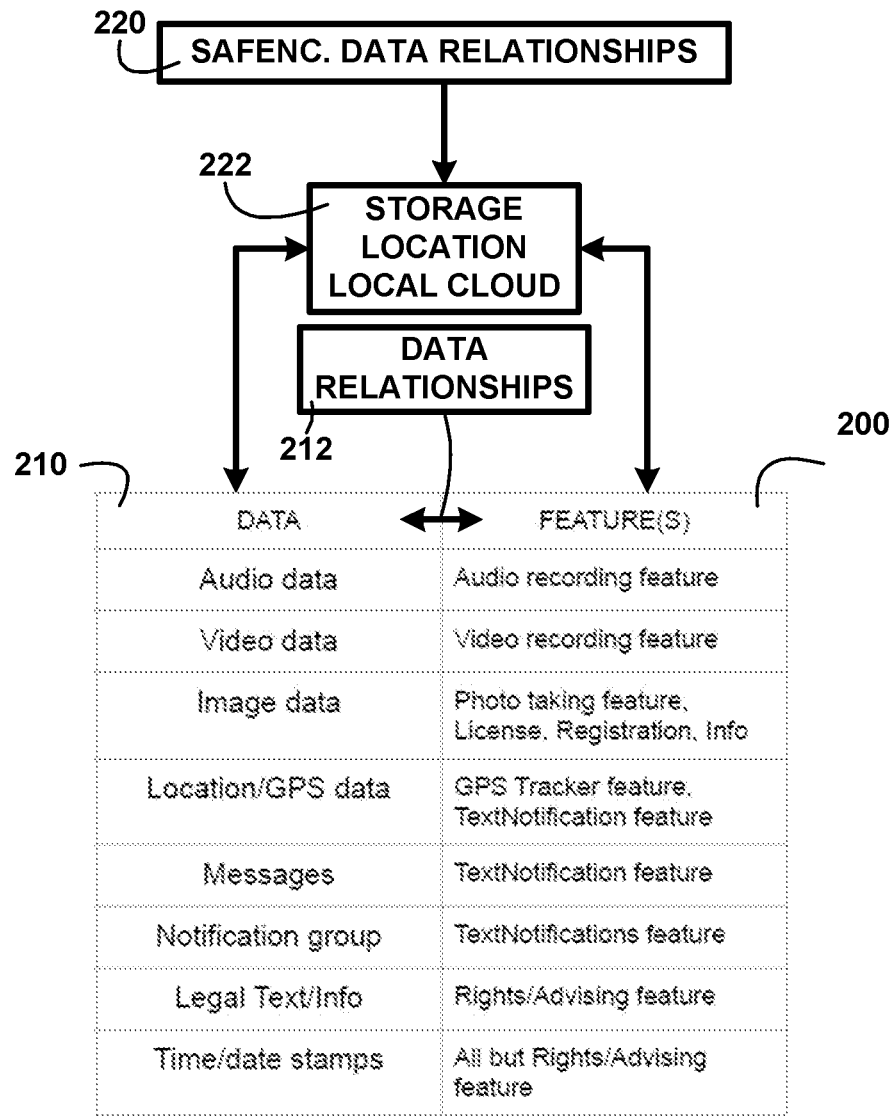
FIG. 2 shows for illustrative purposes only an example of safe encounter data relationships of one embodiment.

FIG. 2 shows a block diagram of an overview of safe encounter data relationships of one embodiment. FIG. 2 shows SAFENC. Data relationships 220 organized with data 210, feature(s) 200, and storage location local cloud 222. The data relationships 212 include Audio data, Audio recording feature, Local and Cloud; Video data, Video recording feature, Local and Cloud; Image data, Photo taking feature License, Registration, Info, Local and Cloud; Location/GPS data, GPS Tracker feature, Text Notification feature. Local and Cloud; Messages, Text Notification feature, Local and Cloud; Notification group, TextNotifications feature, Local, Cloud; Legal Text/Info, Rights/Advising feature, Local and Cloud; and Time/date stamps, All but Rights/Advising feature, Local and Cloud of one embodiment.

A General Safe Encounter App Process Flow

Figure 3:
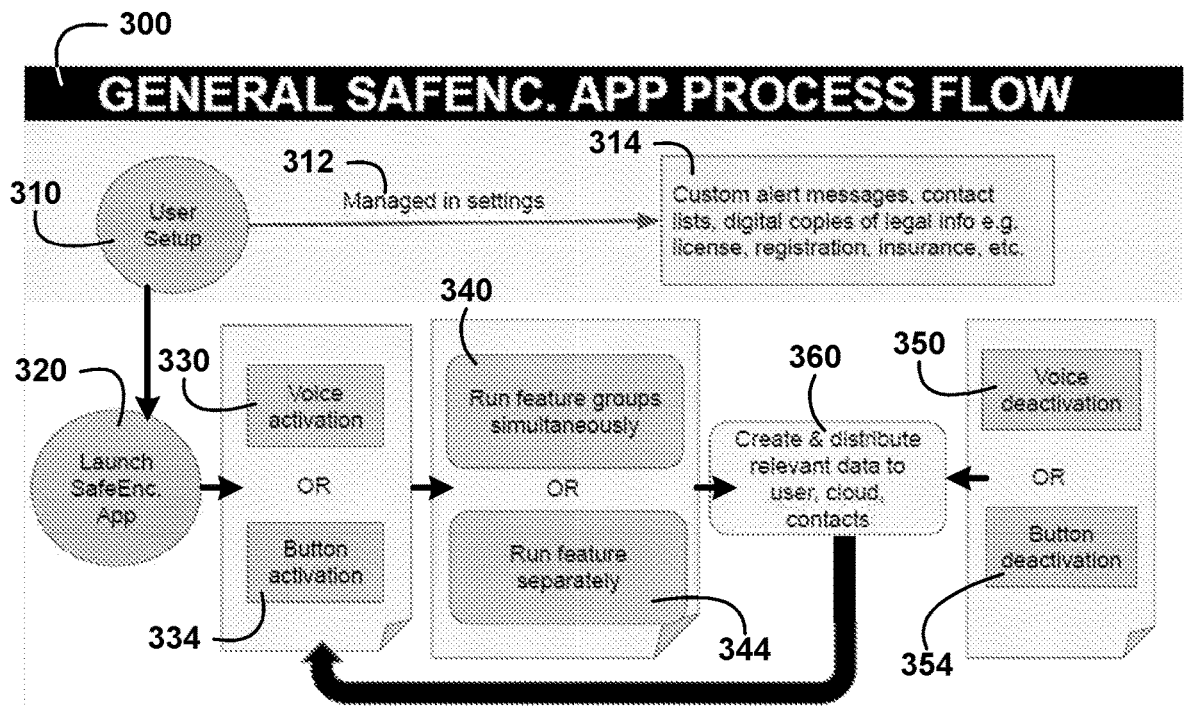
FIG. 3 shows for illustrative purposes only an example of a general safe encounter app process flow of one embodiment.

FIG. 3 shows a block diagram of an overview flow chart of a general safe encounter app process flow of one embodiment. FIG. 3 shows a general SAFENC. App process flow 300 beginning with a User Setup 310 of features Managed in settings 312 including Custom alert messages, contact lists, digital copies of legal info e.g. license, registration, insurance, etc. . . . 314. Users will Launch SafeEnc. App 320 using Button activation 334 or Voice activation 330 to Run feature groups simultaneously 340 or Run feature separately 344. Create & distribute relevant data to user, cloud, contacts 360 using Button deactivation 354 or Voice deactivation 350 of one embodiment.

A Safe Encounter Mobile Application

Figure 4:
FIG. 4 shows for illustrative purposes only an example of a safe encounter mobile app of one embodiment.

FIG. 4 shows for illustrative purposes only an example of a safe encounter mobile application of one embodiment. FIG. 4 shows a police officer 440 and a citizen 450 on the same team 430. The Safe Encounter Mobile Application 400 has a Theme: Social and Racial Justice 420 of one embodiment.

Why your Choices are Critical

Figure 5:
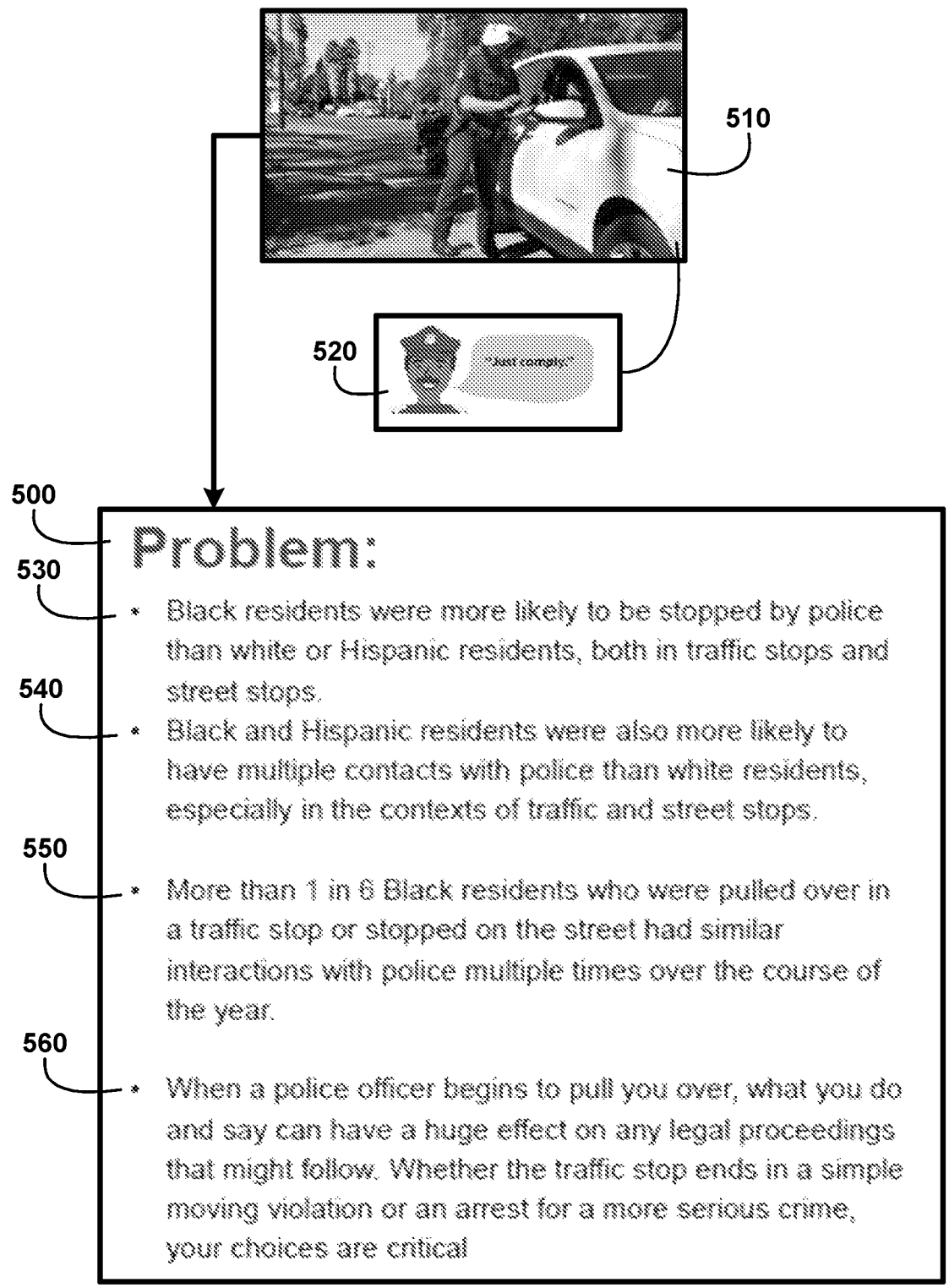
FIG. 5 shows for illustrative purposes only an example of why your choices are critical of one embodiment.

FIG. 5 shows for illustrative purposes only an example of why your choices are critical of one embodiment. FIG. 5 shows a police officer making a traffic stop 510. Below the traffic stop scene is a suggestion to "Just comply" 520. FIG. 5 shows a Problem 500 being confronted by individuals. Black residents were more likely to be stopped by police than white or Hispanic residents, both in traffic stops and street stops 530. Black and Hispanic residents were also more likely to have multiple contacts with police than white residents, especially in the contexts of traffic and street stops 540. More than 1 in 6 Black residents who were pulled over in a traffic stop or stopped on the street had similar interactions with police multiple times over the course of the year 550.

When a police officer begins to pull you over, what you do and say can have a huge effect on any legal proceedings that might follow. Whether the traffic stop ends in a simple moving violation or an arrest for a more serious crime, your choices are critical 560 of one embodiment.

A Safe Encounter

Figure 6:
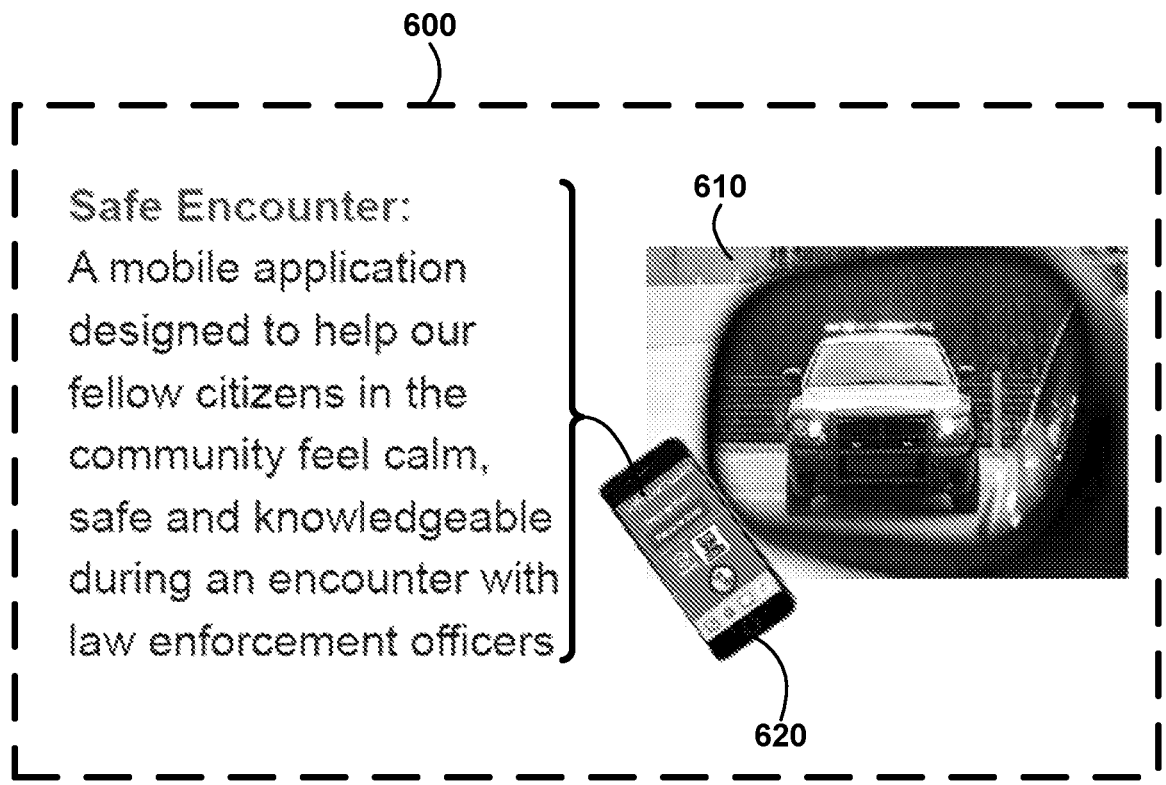
FIG. 6 shows for illustrative purposes only an example of a safe encounter of one embodiment.

FIG. 6 shows for illustrative purposes only an example of a safe encounter of one embodiment. FIG. 6 shows Safe Encounter: A mobile application designed to help our fellow citizens in the community feel calm, safe and knowledgeable during an encounter with law enforcement officers 600. When a driver sees a law enforcement car in a rear view mirror 610 they may become nervous, apprehensive and concerned about what they may have done and the consequences. The Safe Encounter mobile app installed on the driver's mobile digital device 620 for example a smart phone provides assistance to the driver about their approach in dealing with the circumstances. The Safe Encounter mobile app is used to prevent any unwanted and unintentional escalation and informing the driver on for example being calm, how to proceed and inform the driver of their legal rights of one embodiment.

How Does Safe Encounter Work

Figure 7:
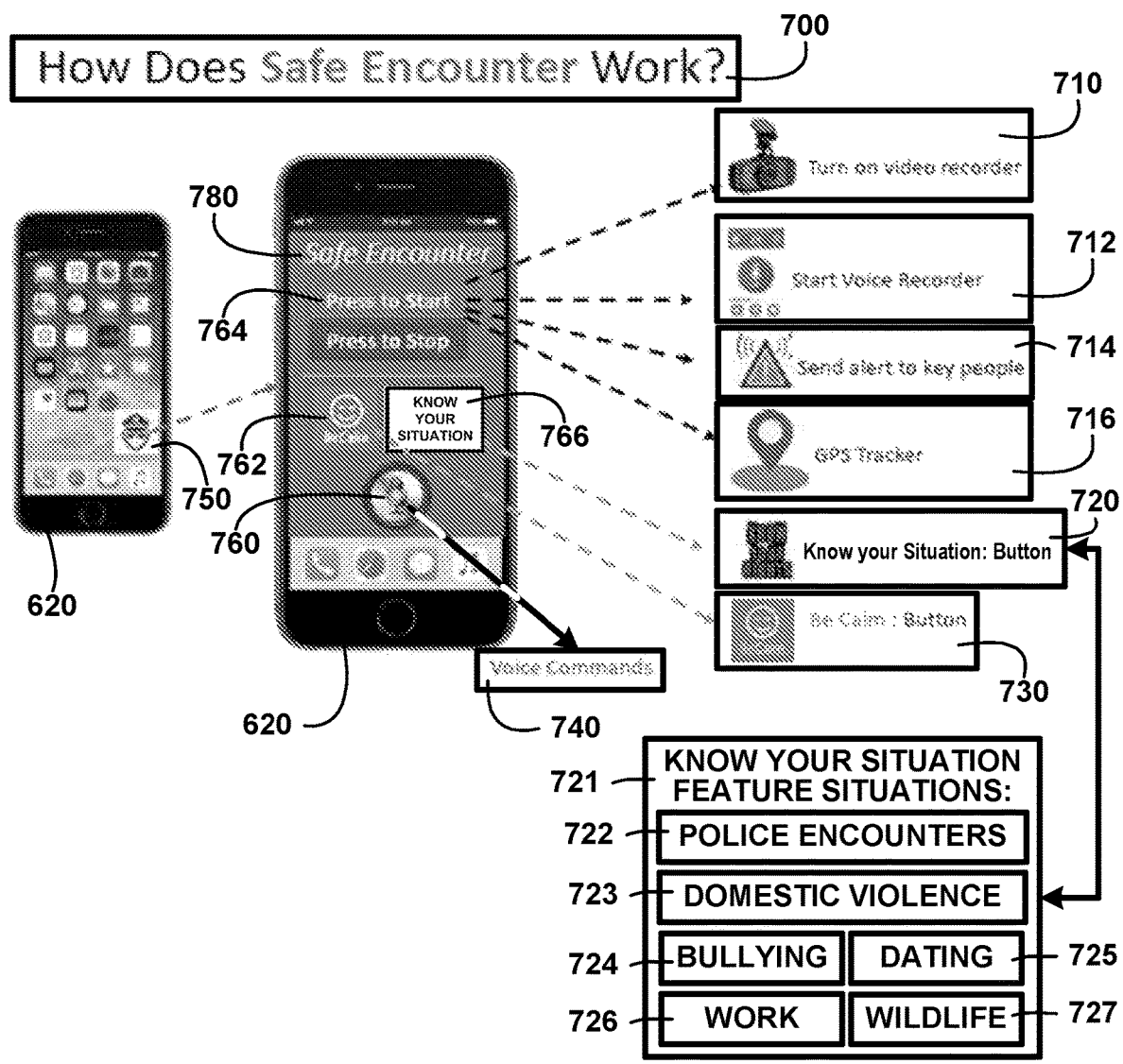
FIG. 7 shows for illustrative purposes only an example of how does safe encounter work of one embodiment.

FIG. 7 shows a block diagram of an overview flow chart of how does safe encounter work of one embodiment. FIG. 7 shows How Does Safe Encounter Work? 700. A driver presses the Safe Encounter mobile app icon 750 on their digital device 620. The Safe Encounter mobile app 780 opens up and displays buttons for features. A driver may tap the press to start button 764 to turn on video recorder 710, start voice recorder 712, send alert to key people 714 and a GPS tracker 716. The driver may press the be calm icon 762 to activate a be calm: button 730 to display methods to reduce their nervousness and remain calm. The driver may press the know your situation icon 766 to activate a Know Your Situation: button 720 to display what legal rights may apply in the circumstances. Know Your Situation feature situations: 721 include Police Encounters 722, Domestic Violence 723, Bullying 724, Dating 725, Work 726, and Wildlife 727. The driver may press the microphone icon 760 to activate a voice commands 740 feature allowing the driver to vocalize any additional commands of one embodiment.

Clicking the Safe Encounter Icon

Figure 8:
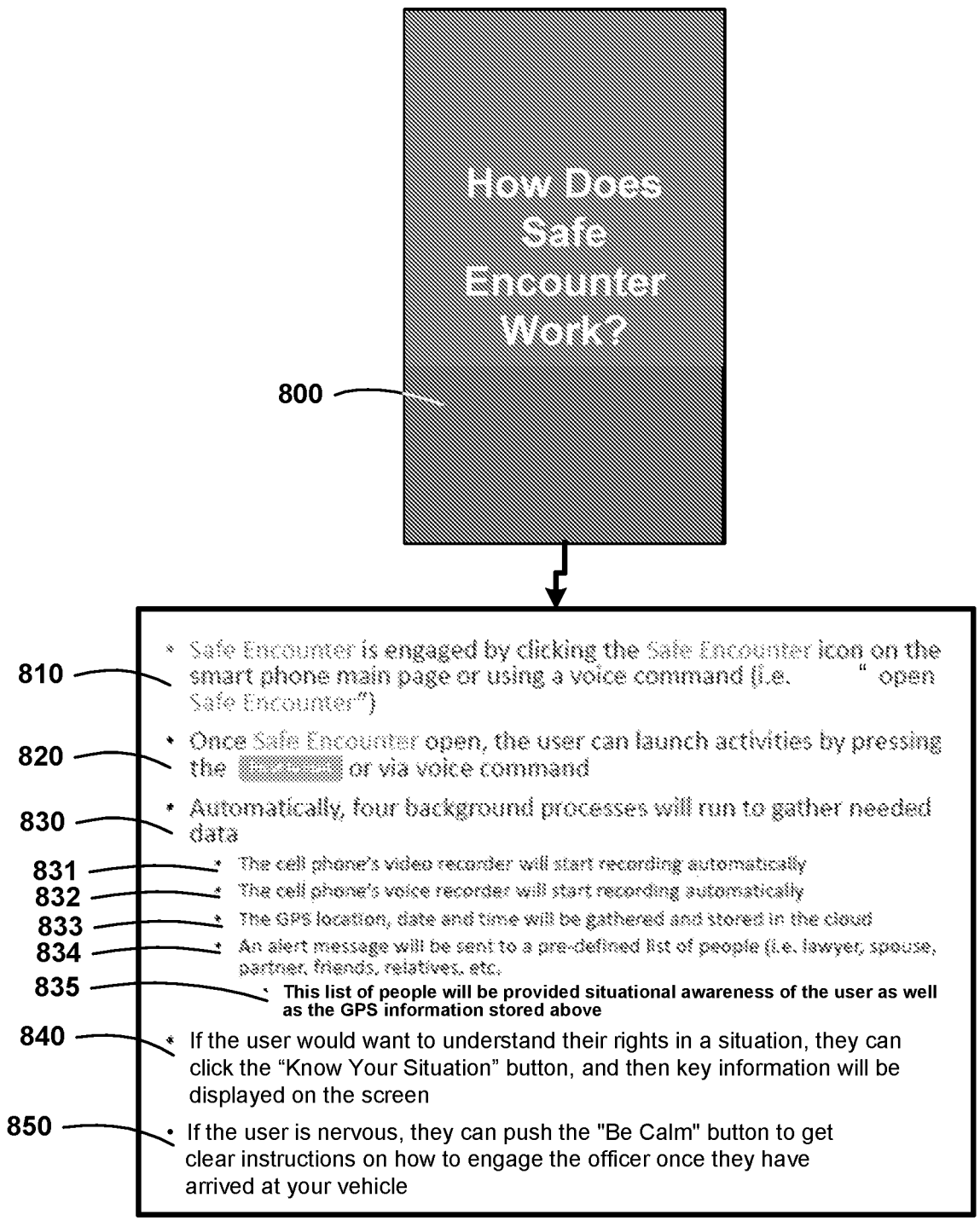
FIG. 8 shows for illustrative purposes only an example of clicking the safe encounter icon of one embodiment.

FIG. 8 shows for illustrative purposes only an example of clicking the safe encounter icon of one embodiment. FIG. 8 shows Safe Encounter is engaged by clicking the Safe Encounter icon on the smart phone main page or using a voice command (i.e. "open Safe Encounter") 810. Once Safe Encounter opens, the user can launch activities by pressing the press to start or via voice command 820. Automatically, four background processes will run to gather needed data 830. The cell phone's video recorder will start recording automatically 831. The cell phone's voice recorder will start recording automatically 832. The GPS location, date and time will be gathered and stored in the cloud 833.

An alert message will be sent to a pre-defined list of people (i.e. lawyer, spouse, partner, friends, relatives, etc. 834. This list of people will be provided situational awareness of the user as well as the GPS information stored above 835. If the user would want to understand their rights, they can click the "Know Your Situation" button, and then key information will be displayed on the screen 840. If the user is nervous, they can push the "Be Calm" button to get clear instructions on how to engage the officer once they have arrived at your vehicle 850 of one embodiment.

How Does the Video Recorder Work?

Figure 9:
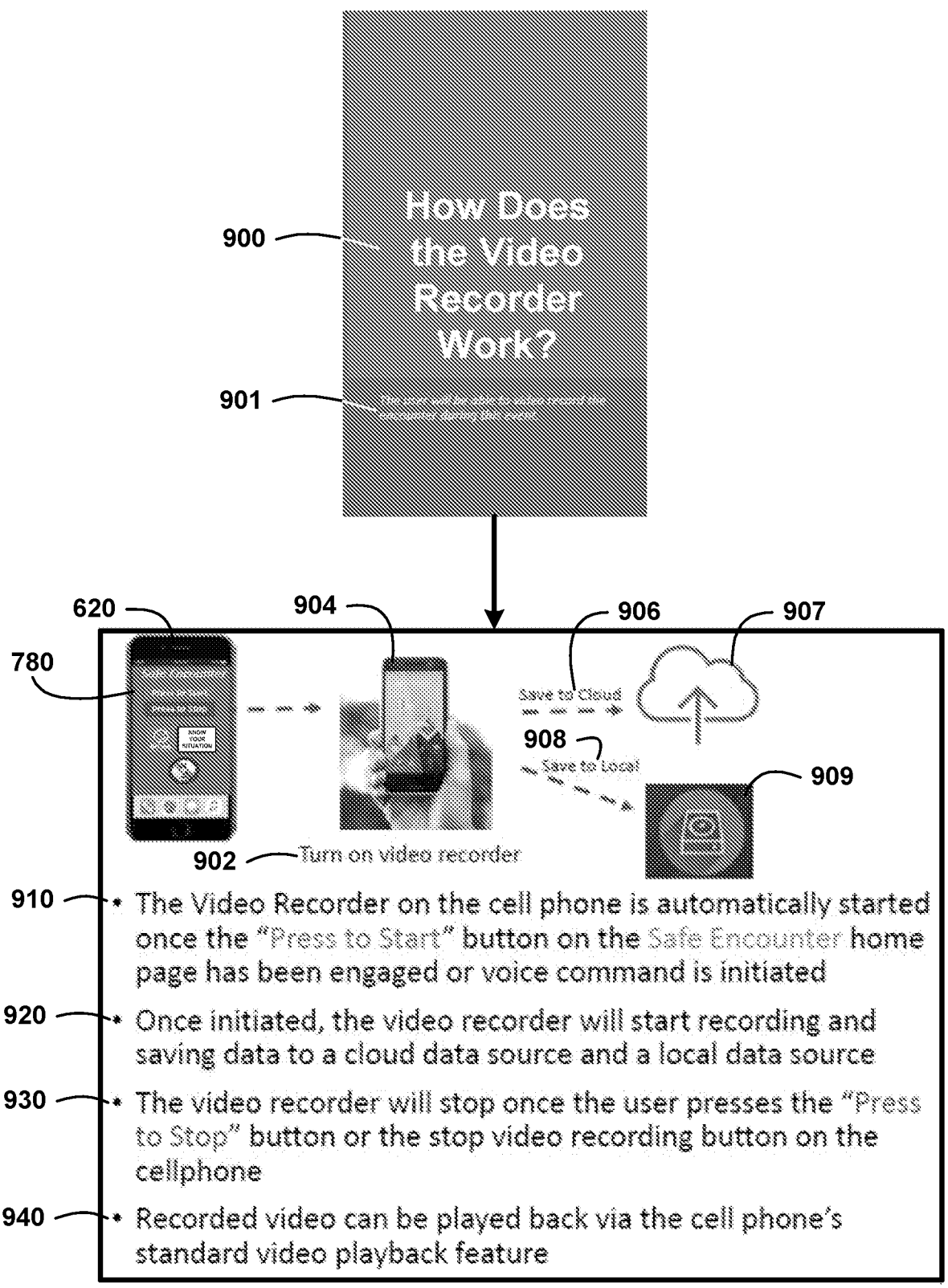
FIG. 9 shows for illustrative purposes only an example of how does the video recorder work of one embodiment.

FIG. 9 shows for illustrative purposes only an example of how does the video recorder work of one embodiment. FIG. 9 shows how does the video recorder work? 900. The driver taps the press start button of the Safe Encounter mobile app 780 on the driver's mobile digital device 620 to turn on video recorder 902 feature of the started Safe Encounter mobile app 904. The recorded video of an event is automatically transmitted to save to cloud 906. The cloud 907 stores the recorded video and simultaneously to save to local 908 memory databases 909. The user will be able to video record the encounter during this event 901.

The Video Recorder on the cell phone is automatically started once the "Press to Start" button on the Safe Encounter home page has been engaged or voice command is initiated 910. Once initiated, the video recorder will start recording and saving data to a cloud data source and a local data source 920. The video recorder will stop once the user presses the "Press to Stop" button or the stop video recording button on the cellphone 930. Recorded video can be played back via the cell phone's standard video playback feature 940 of one embodiment.

How Does the Voice Recorder Work

Figure 10:
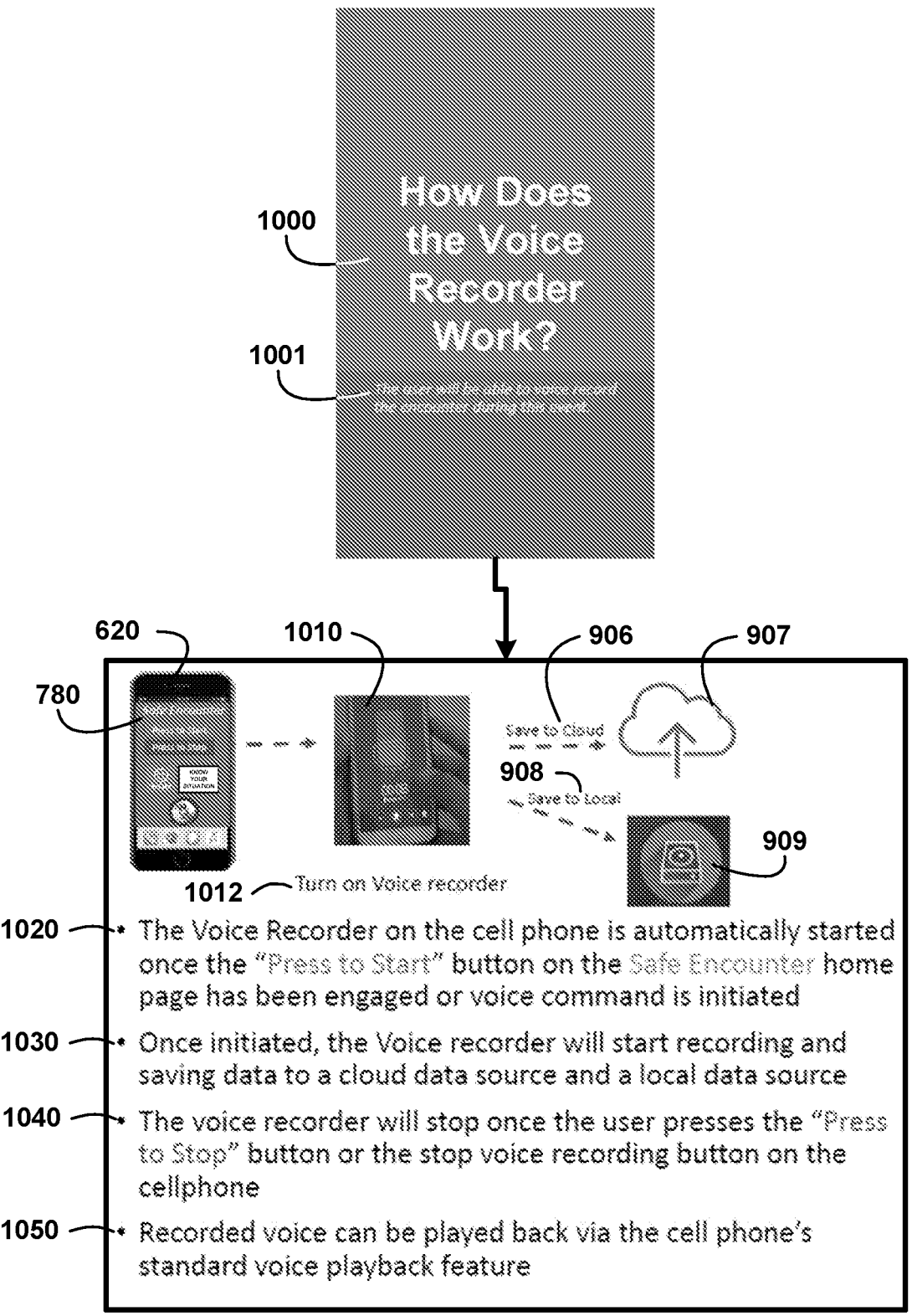
FIG. 10 shows for illustrative purposes only an example of how does the voice recorder work of one embodiment.

FIG. 10 shows for illustrative purposes only an example of how does the voice recorder work of one embodiment. FIG. 10 shows how does the voice recorder work? 1000. The driver taps the press the start button of the Safe Encounter mobile app 780 on the driver's mobile digital device 620 to turn on voice recorder 1012 feature of the started Safe Encounter mobile app 780. The voice recording 1010 of an event is automatically transmitted to save to cloud 906. The cloud 907 stores the voice recordings and simultaneously to save to local 908 memory databases 909. The user will be able to voice record the encounter during this event 1001.

The Voice Recorder on the cell phone is automatically started once the "Press to Start" button on the Safe Encounter home page has been engaged or voice command is initiated 1020. Once initiated, the Voice recorder will start recording and saving data to a cloud data source and a local data source 1030. The voice recorder will stop once the user presses the "Press to Stop" button or the stop voice recording button on the cellphone 1040. Recorded voice can be played back via the cell phone's standard voice playback feature 1050 of one embodiment.

How Does Send Alert Text Work

Figure 11:
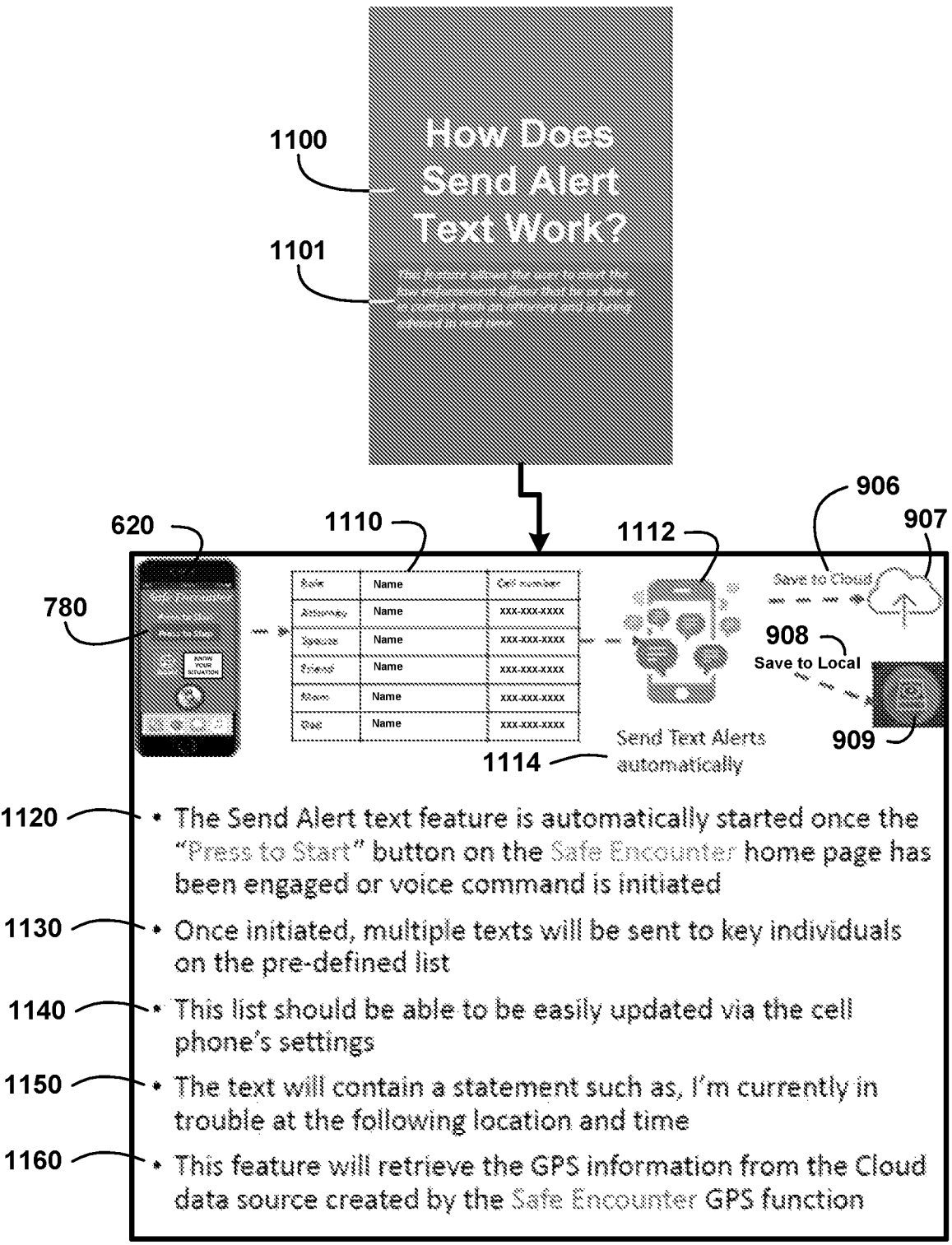
FIG. 11 shows for illustrative purposes only an example of how does send alert text work of one embodiment.

FIG. 11 shows for illustrative purposes only an example of how does send alert text work of one embodiment. FIG. 11 shows how does send alert text work? 1100. This feature allows the user to alert the law enforcement officer that he or she is in contact with an attorney and is being advised in real time 1101. The driver taps the press the start button of the Safe Encounter mobile app 780 on the driver's mobile digital device 620 to turn on send alert text 1110 feature of the Safe Encounter mobile app 780. The alert text 1112 for an event is automatically transmitted to save to cloud 906. The cloud 907 stores the alert text 1112 and simultaneously to save to local 908 memory databases 909. The Send Alert text feature is automatically started once the "Press to Start" button on the Safe Encounter home page has been engaged or voice command is initiated 1120.

Once initiated, multiple texts will be sent to key individuals on the pre-defined list 1130. This list should be able to be easily updated via the cell phone's settings 1140. The text will contain a statement such as; I'm currently in trouble at the following location and time 1150. This feature will retrieve the GPS information from the Cloud data source created by the Safe Encounter GPS function 1160. Send Text Alerts automatically Save to Cloud, Save to a Local memory device.

Send Text Alerts automatically 1114 will be transmitted to the key individuals on the pre-defined list with their Role, Name and Cell number, for example Attorney, Name, xxx-xxx-xxxx; Spouse, Name, xxx-xxx-xxxx; Friend, Name, xxx-xxx-xxxx; Mom, Name, xxx-xxx-xxxx; Dad, Name, xxx-xxx-xxxx of one embodiment.

How Does Retrieve GPS Info Work

Figure 12:
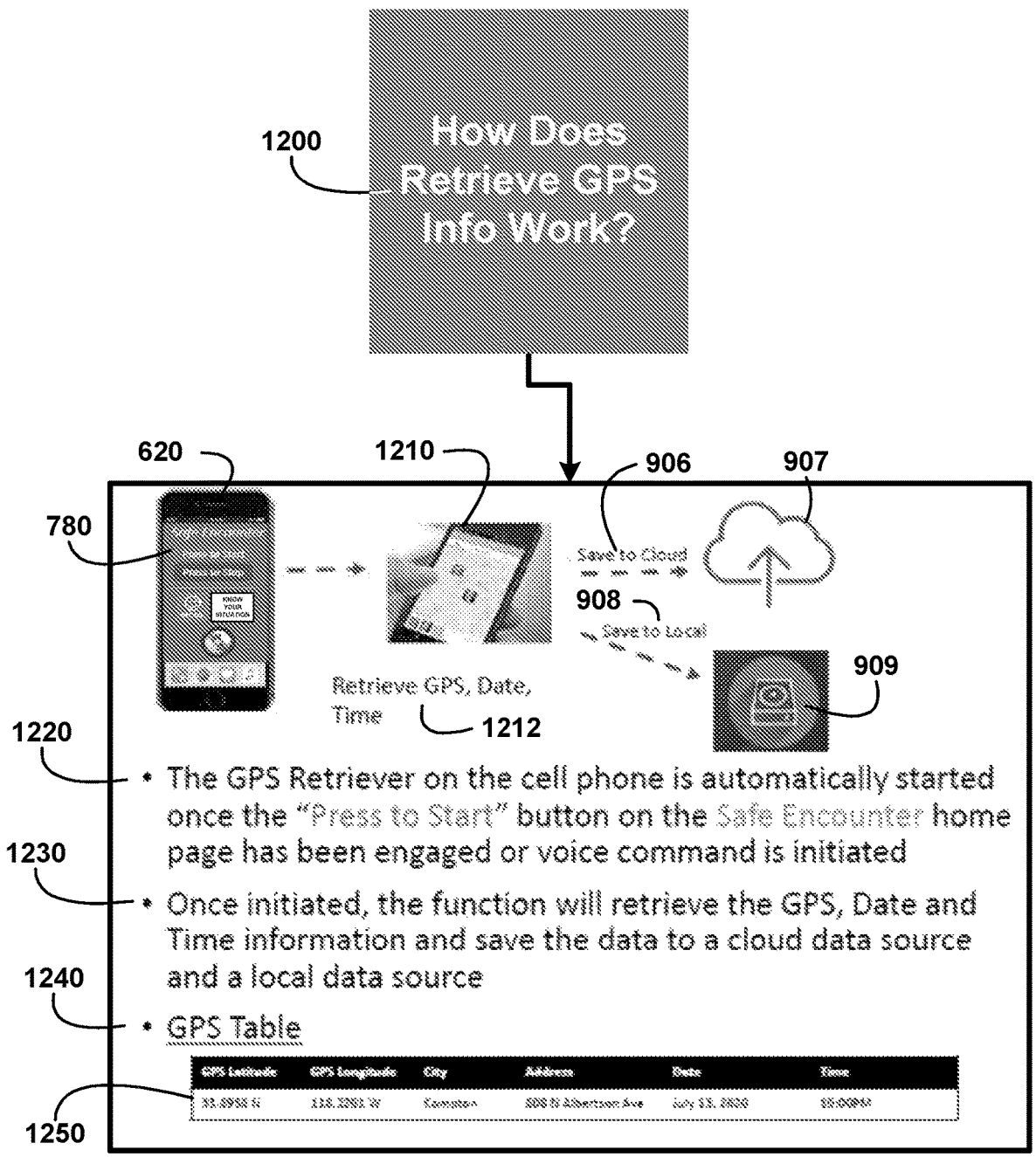
FIG. 12 shows for illustrative purposes only an example of how does retrieve GPS info work of one embodiment.

FIG. 12 shows for illustrative purposes only an example of how does retrieve GPS info work of one embodiment. FIG. 12 shows How does retrieve GPS info work? 1200. The driver taps the press the start button of the Safe Encounter mobile app 780 on the driver's mobile digital device 620 to turn on a retrieve GPS info 1210 feature of the started Safe Encounter mobile app 780. The retrieve GPS, date, time 1212 of an event is automatically transmitted to save to cloud 906. The cloud 907 stores the GPS, date, time and simultaneously to save to local 908 memory databases 909.

The GPS Retriever on the cell phone is automatically started once the "Press to Start" button on the Safe Encounter home page has been engaged or voice command is initiated 1220. Once initiated, the function will retrieve the GPS, Date and Time information and save the data to a cloud data source and a local data source 1230. An example of a GPS Table 1240 will Retrieve GPS, Date, Time; Save to Cloud and Save to a Local memory device. The GPS table 1240 will include a GPS Latitude, GPS Longitude, City, Address, Date, Time for example 33.8958 N, 118.2201 W, Compton, 808 N Albertson Ave, Jul. 13, 2020 and 10:00 PM 1250 of one embodiment.

How Does Know Your Situation Work

Figure 13:
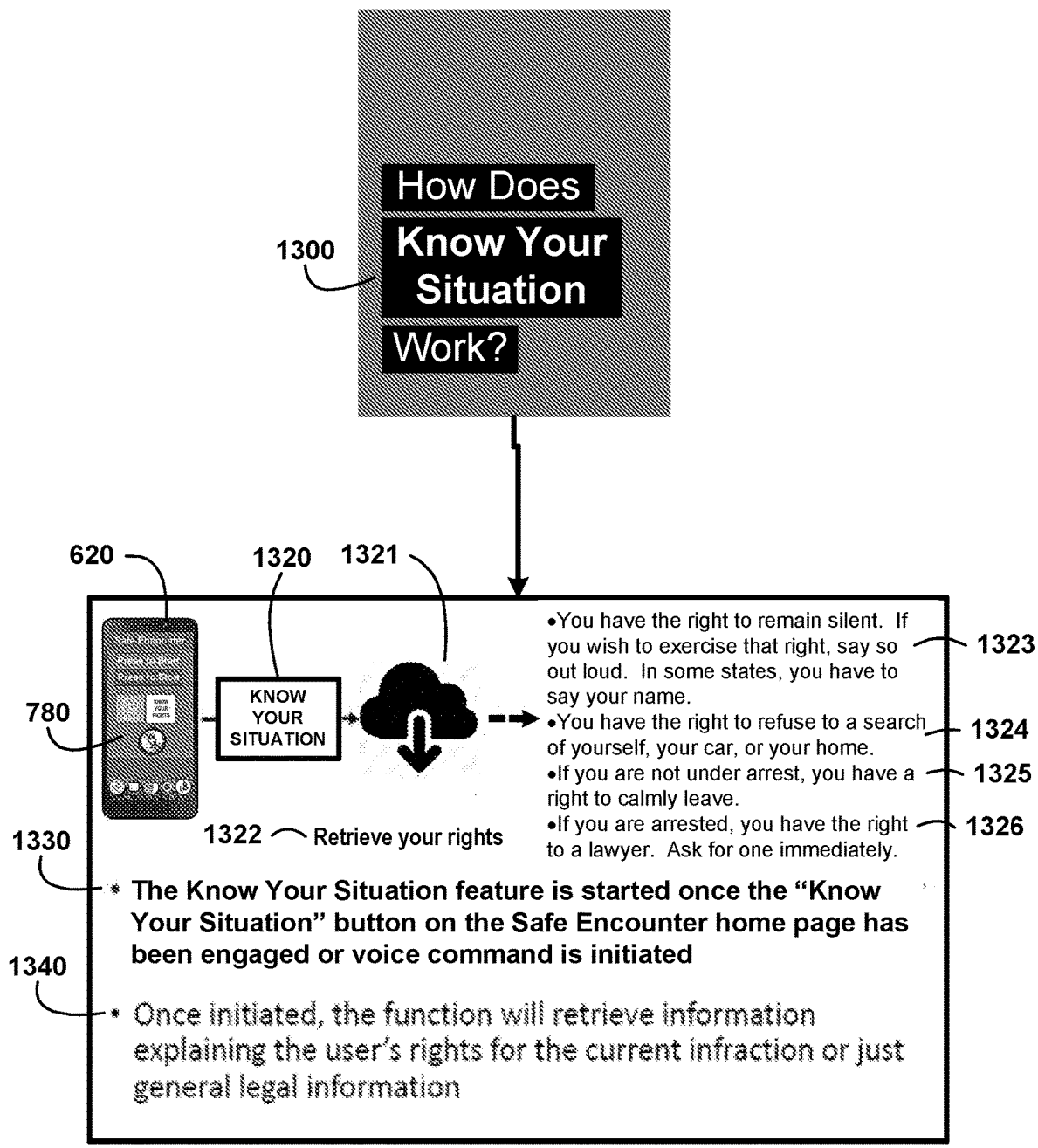
FIG. 13 shows for illustrative purposes only an example of how does know your situation work of one embodiment.

FIG. 13 shows for illustrative purposes only an example of how does know your situation work of one embodiment. FIG. 13 shows how does know your situation work? 1300. The driver taps the press the start button of the Safe Encounter mobile app 780 on the driver's mobile digital device 620 to turn on the know your situation 1320 feature of the Safe Encounter mobile app 780. The know your situation 1321 feature displays the user's rights on the user's digital device retrieved from the cloud. The Know your situation feature is started automatically once the "Know your situation" button on the Safe Encounter home page has been engaged or voice command is initiated 1330. Once initiated, the function will retrieve information explaining the user's rights for the current infraction or just general legal information 1340.

Retrieve your rights 1322 will display for example, You have the right to remain silent. If you wish to exercise that right, say so out loud. In some states, you have to say your name 1323. You have the right to refuse to a search of yourself, your car, or your home 1324. If you are not under arrest, you have a right to calmly leave 1325. If you are arrested, you have the right to a lawyer. Ask for one immediately 1326 of one embodiment.

How Does be Calm Work

Figure 14:
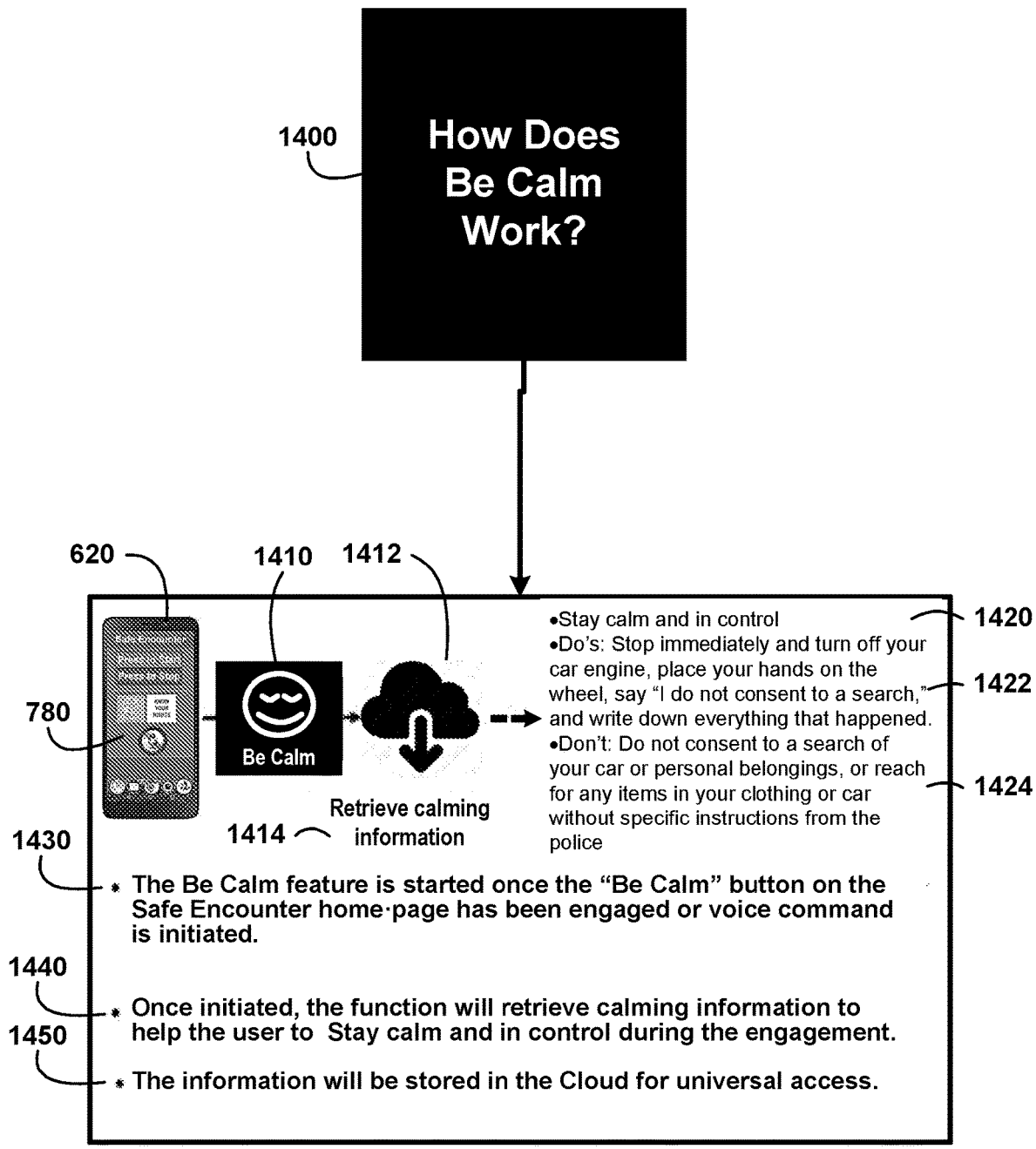
FIG. 14 shows for illustrative purposes only an example of how does be calm work of one embodiment.

FIG. 14 shows for illustrative purposes only an example of how does be calm work of one embodiment. FIG. 14 shows how does be calm work? 1400. The user taps the be calm icon 1410 to retrieve calming information 1414 from the cloud 1412. The calming information is displayed including for example Stay calm and in control 1420. Do's: Stop immediately and turn off your car engine, place your hands on the wheel, say "I do not consent to a search," and write down everything that happened 1422. Don't: Do not consent to a search of your car or personal belongings, or reach for any items in your clothing or car without specific instruction from the police 1424. The Be Calm feature is started once the "Be Calm" button on the Safe Encounter home page has been engaged or voice command is initiated 1430.

Once initiated, the function will retrieve calming information to help the user to Stay calm and in control during the engagement 1440. The information will be stored in the Cloud for universal access 1450 to retrieve calming information. Stay calm and in control. Do's: Stop immediately and turn off your car engine, place your hands on the wheel, say "I do not consent to a search," and write down everything that happened. Don't: Do not consent to a search of your car or personal belongings, or reach for any items in your clothing or car without specific instructions from the police of one embodiment.

Safe Encounter Mobile App Network

Figure 15:
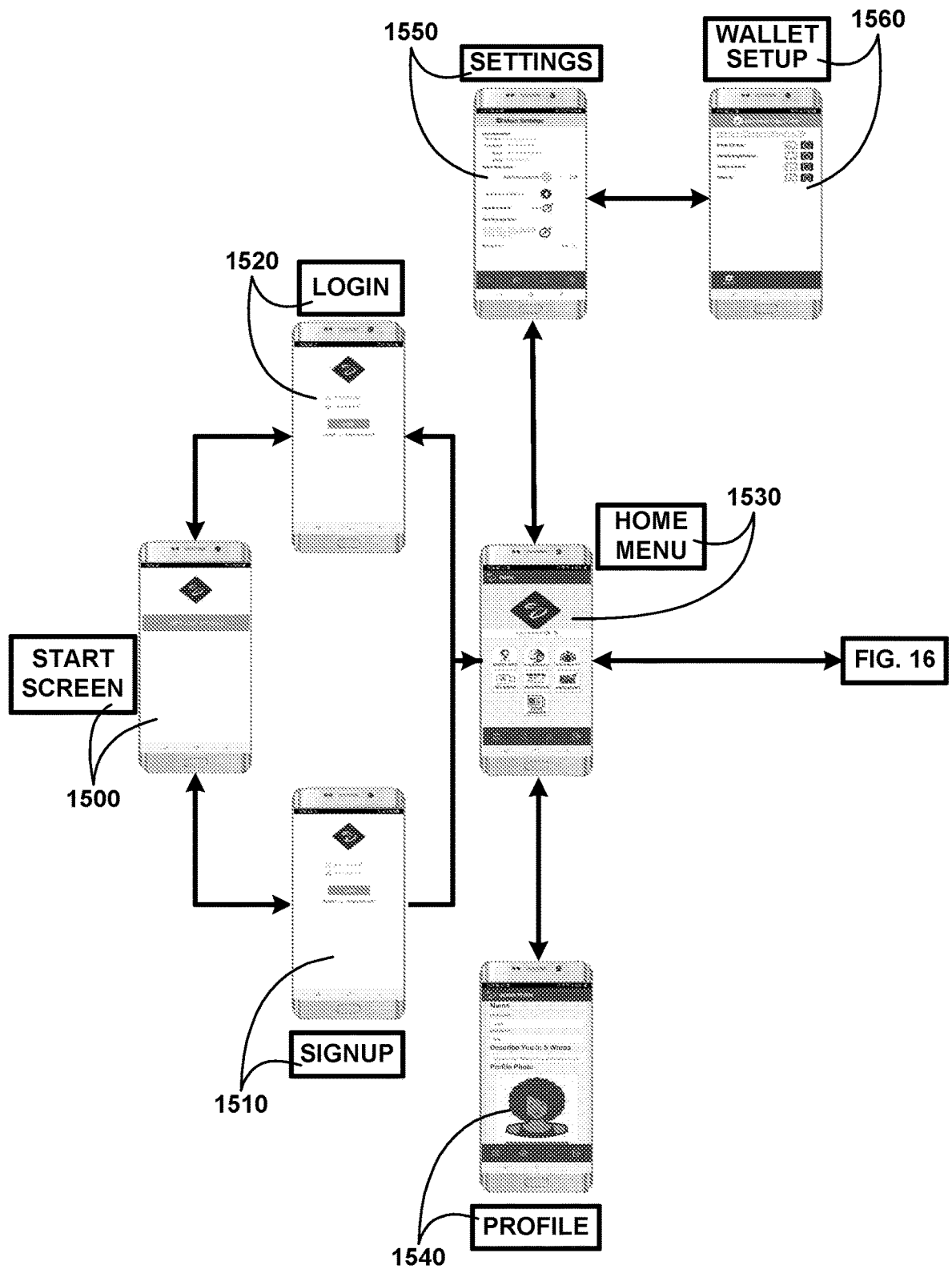
FIG. 15 shows for illustrative purposes only an example of a safe encounter mobile app structure of one embodiment.

FIG. 15 shows for illustrative purposes only an example of a safe encounter mobile app structure of one embodiment. FIG. 15 shows safe encounter mobile app structure for example a start screen 1500. A user may signup 1510 using this screen to enter their name and other personal information. Once signed up the user man login 1520. A home menu 1530 screen allows the user to navigate to other features. The user may enter for example a photo in the profile 1540 screen. The settings 1550 screen allows to user to choose default settings or personalize settings. A wallet setup 1560 allows a user to enter data for making purchases. Additional features are described in FIG. 16 that are accessible by the user of one embodiment.

Safe Encounter Mobile App Features

Figure 16:
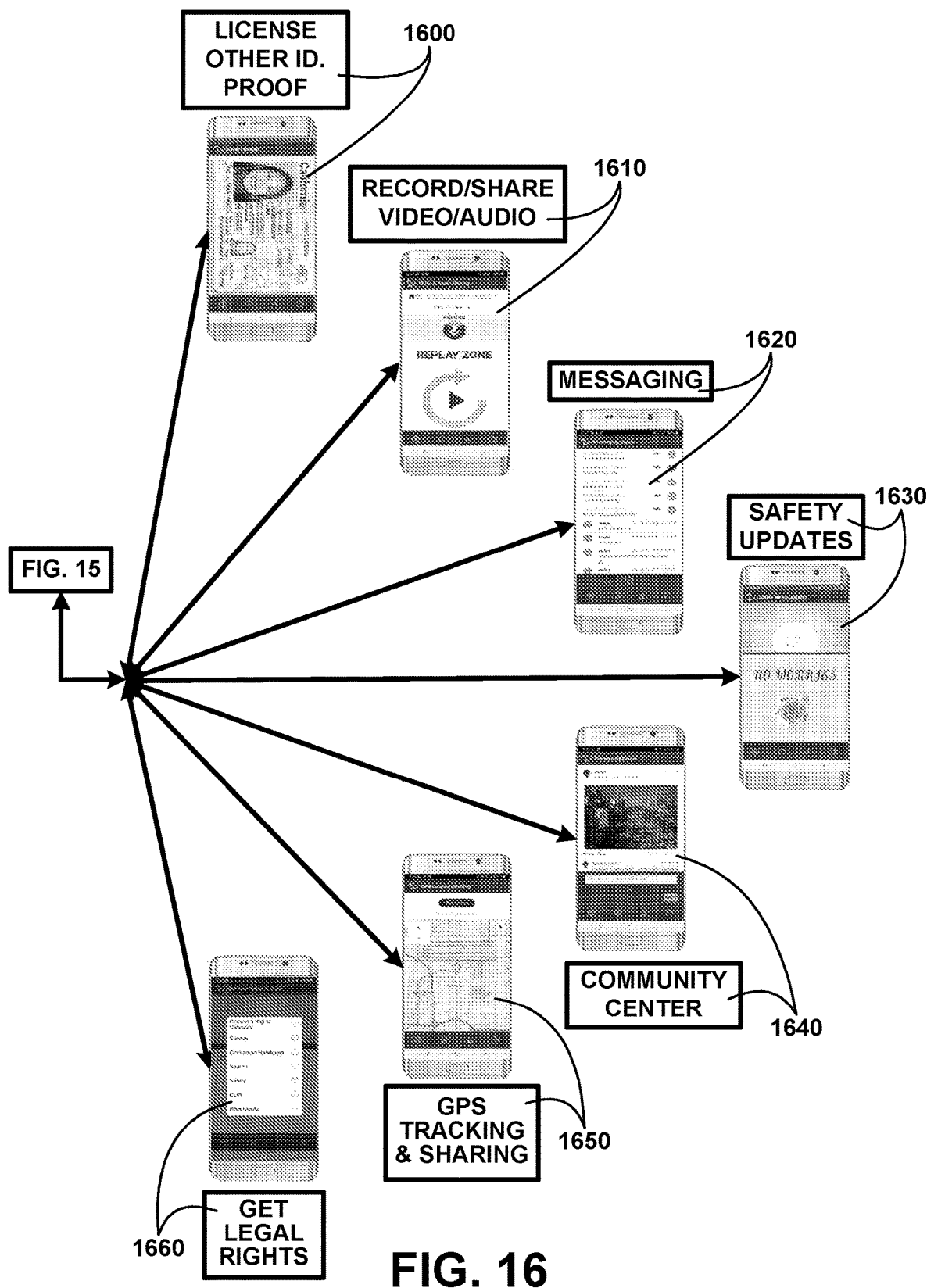
FIG. 16 shows for illustrative purposes only an example of safe encounter mobile app features of one embodiment.

FIG. 16 shows for illustrative purposes only an example of safe encounter mobile app features of one embodiment. FIG. 16 shows continuation from FIG. 15 showing features where a user may enter personalized information for example license other ID proof 1600. A user may record/share video/audio 1610 with other users. Messaging 1620 allows a user to communicate with other users. Safety updates 1630 are automatically updated in the cloud 120 of FIG. 1 and available on demand by the user. A community center 1640 feature will display planned events in the user's local area and other areas. GPS tracking & sharing 1650 allows the users to provide their physical location to other users. A get legal rights 1660 feature allows the user to search for legal rights in various circumstances that may arise of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   providing a voice command activation of at least one encounter mobile app module on a smart phone of a user during an encounter with law enforcement personnel;
   recording automatically video using a camera of the smart phone and voice and sound using a microphone of the smart phone during the encounter with the law enforcement personnel;
   sending automatically alert texts using a text messaging module of the smart phone to a predetermined list of individuals during the encounter;
   acquiring and storing automatically GPS data of a location, date and time associated with the encounter on a cloud data module; and
   saving automatically video, voice, sound and alert texts recordings to a cloud data module and a local data module of the encounter with the law enforcement personnel.

2. The method of claim 1, further comprising providing automatically at least one encounter mobile app module from a group comprising a video recording module, voice recording module, text notifications module, GPS tracker module, and a rights advising module.

3. The method of claim 1, further comprising using the voice command with the smart phone microphone for setting up at least one encounter mobile app module including custom alert messages, contact lists, digital copies of legal info including driver's license, registration, and insurance.

4. The method of claim 1, further comprising using the voice command with the smart phone microphone for activating and running a group of encounter mobile app modules simultaneously and separately.

5. The method of claim 1, further comprising running four background processes on the encounter mobile app automatically for gathering data including recording video, voice and sound, sending text alerts, and recording GPS data of a location, date and time associated with the encounter and storing the gathered data in the cloud data module.

6. The method of claim 1, further comprising playing back recorded video using the encounter mobile app with a standard video playback module of the smart phone.

7. The method of claim 1, further comprising texting automatically alert texts to the predetermined list of individuals including at least a lawyer, spouse, partner, friends, and relatives.

8. An apparatus, comprising:
   at least one encounter mobile app module coupled to a smart phone of a user having a program including instructions that, when executed by at least one computer processor is configured for responding to a voice command for activating at least one encounter mobile app module during an encounter with law enforcement personnel;
   a video recorder coupled to a camera of the smart phone configured for recording automatically video of the user and the law enforcement personnel during the encounter;
   a voice recorder module coupled to a microphone of the smart phone configured for recording automatically voice and sound of the user and the law enforcement personnel during the encounter;
   a text messaging module coupled to a texting system of the smart phone configured for sending automatically alert texts to a predetermined list of individuals during the encounter;
   a data gathering device coupled to the smart phone configured for acquiring from the smart phone and storing on a cloud data module GPS data of a location, date and time associated with the encounter; and
   a data transmission device coupled to the smart phone configured for saving automatically video, voice, sound and alert texts recordings to a cloud data module and a local data module during the encounter.

9. The apparatus of claim 8, further comprising a voice command module coupled to the smart phone microphone and configured for starting automatically at least one encounter mobile app module from a group comprising a video recording module, voice recording module, text notifications module, GPS tracker module, and a rights advising module.

10. The apparatus of claim 8, further comprising a voice command module coupled to the smart phone microphone and configured for setting up at least one encounter mobile app module including custom alert messages, contact lists, digital copies of legal information including driver's license, registration, and insurance.

11. The apparatus of claim 8, further comprising a voice command module coupled to the smart phone microphone and configured for activating and running a group of encounter mobile app modules simultaneously and separately.

12. The apparatus of claim 8, further comprising a database of the encounter mobile app coupled to the smart phone processor and configured for recording the predetermined list of individuals including at least a lawyer, spouse, partner, friends, and relatives.

13. The apparatus of claim 8, further comprising the text messaging module alert texts configured to include GPS data of a location, date and time associated with the encounter.

14. The apparatus of claim 8, further comprising running four background processes automatically for gathering data includes recording video, voice and sound, sending text alerts, and recording GPS location, date and time and storing the gathered data in the cloud data module.

\* \* \* \* \*